United States Patent [19]
Strohschein

[11] 3,859,926
[45] Jan. 14, 1975

[54] CABLE CONTROL SYSTEM FOR TRANSMITTING POWER

[75] Inventor: Clayton B. Strohschein, De Ridder, La.

[73] Assignee: The Raymond Lee Organization, Inc., New York, N.Y.; a part interest

[22] Filed: Feb. 1, 1973

[21] Appl. No.: 328,872

[52] U.S. Cl. ............................................. 104/178
[51] Int. Cl. .............................................. B61b 7/00
[58] Field of Search ........... 104/178, 165, 173, 174, 104/175, 180

[56] References Cited
UNITED STATES PATENTS
3,221,667  12/1965  Watt .................................... 104/178
3,336,878   8/1967  Malakhoff ............................ 104/178

Primary Examiner—Robert G. Sheridan
Assistant Examiner—Richard A. Bertsch
Attorney, Agent, or Firm—Daniel Jay Tick

[57] ABSTRACT

A movable housing has an input fulcrum thereon. An input arm is pivotally mounted on the input fulcrum and has a left input arm pivotally mounted at its left end, hanging downward into the housing and having a first guide roller mounted at its free end in the housing. A right input arm is pivotally mounted at its right end, hangs downward into the housing and has a second guide roller mounted at its free end in the housing. An output arm is pivotally mounted on an output fulcrum stationarily positioned at right angles to the input fulcrum. A first cable is affixed at one end to the upper end of the output arm and is stationarily affixed at the other end and abuts the first guide roller and some of the plurality of guide rollers. A second cable is affixed at one end to the lower end of the output arm and is stationarily affixed at the other and abuts the second guide roller and others of the plurality of guide rollers. When the right end of the input arm is depressed, the second cable is depressed by the second guide roller and pulls the lower end of the output arm to the right. When the left end of the input arm is depressed, the first cable is depressed by the first guide roller and pulls the upper end of the output arm to the right.

5 Claims, 2 Drawing Figures

PATENTED JAN 14 1975　3,859,926
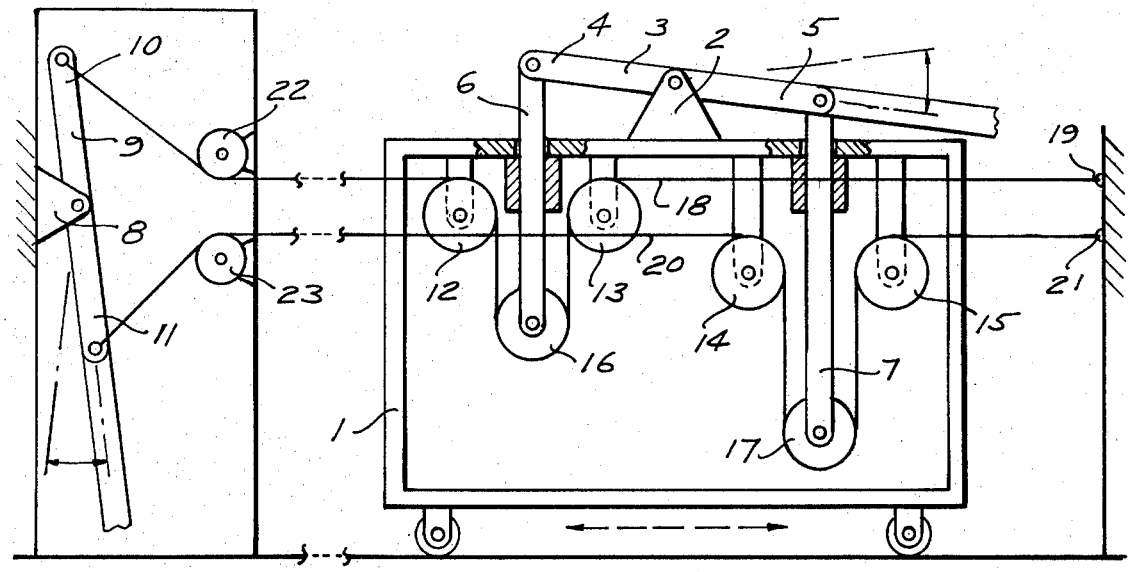
FIG. 1
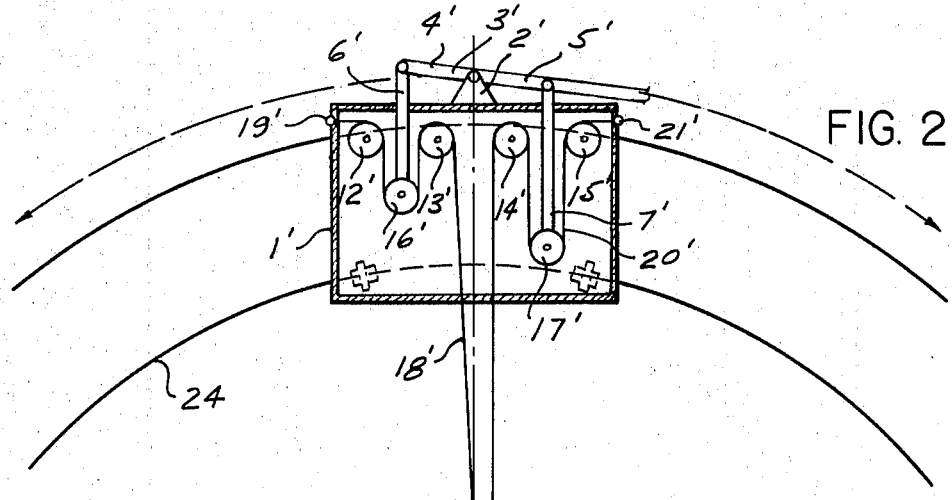
FIG. 2
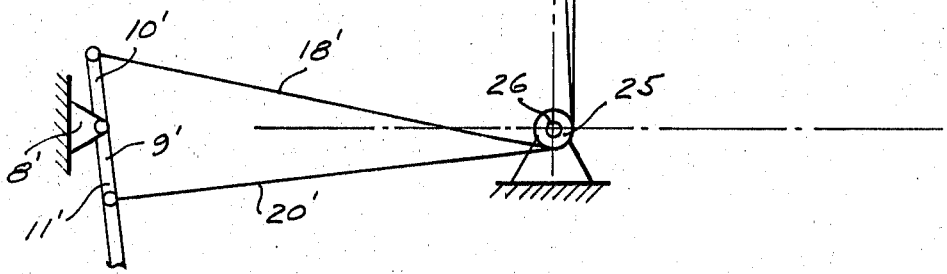

CABLE CONTROL SYSTEM FOR TRANSMITTING POWER

DESCRIPTION OF THE INVENTION

The present invention relates to a cable control system. More particularly, the invention relates to a cable control system for transmitting power.

The principal object of the invention is to provide a cable control system which permits control and power transmission at an unlimited number of stationary, movable or moving positions.

An object of the invention is to provide a cable control system of light weight and simple structure which functions with efficiency, effectiveness and reliability.

The cable control system of the invention provides a forward to rearward or fore and aft movable housing, held in positive alignment by sufficient rollers and/or slides along parallel rails and/or slides. The cable control system of the invention protects the operators or drivers of any vehicles incorporating said system from shock or bodily injury. The slides and rails of the system of the invention function as shock absorbing devices, as hereinafter described.

The cable control system of the invention provides mechanical controls for shock absorbers to protect a sliding seat passenger compartment in a vehicle. An additional soft windshield is provided in a vehicle as part of and moving rigidly with the protected compartment.

The cable control system of the invention provides positive safety features, low pollution, economy of operation and standardization of all vehicle compartments as to rail mountings and safety precautions, and will have application in future electric, gas, atomic engines and monorail guided systems.

In order that the invention may be readily carried into effect, it will now be described with reference to the accompanying drawing, wherein:

FIG. 1 is a schematic diagram, partly in section, of an embodiment of the cable control system of the invention; and FIG. 2 is a schematic diagram of another embodiment of the cable control system of the invention.

The cable control system of the invention comprises a movable housing 1 (FIG. 1) or 1' (FIG. 2) having an input fulcrum 2 (FIG. 1) or 2' (FIG. 2) thereon. An input arm 3 (FIG. 1) or 3' (FIG. 2) is pivotally mounted on the input fulcrum 2 or 2' and has a left end 4 (FIG. 1) or 4' (FIG. 2) and a right end 5 (FIG. 1) or 5' (FIG. 2).

A left input arm 6 (FIG. 1) or 6' (FIG. 2) is pivotally mounted on the input arm 3 or 3' at the left end 4 or 4' thereof and hangs downward into the housing 1 or 1'. A right input arm 7 (FIG. 1) or 7' (FIG. 2) is pivotally mounted on the input arm 3 or 3' at the right end 5 or 5' thereof and hangs downward into the housing 1 or 1'.

A stationary output fulcrum 8 (FIG. 1) or 8' (FIG. 2) is positioned at right angles to the input fulcrum 2 or 2'. An output arm 9 (FIG. 1) or 9' (FIG. 2) is pivotally mounted on the output fulcrum 8 or 8' and has an upper end 10 (FIG. 1) or 10' (FIG. 2) and a lower end 11 (FIG. 1) or 11' (FIG. 2).

A plurality of guide rollers 12, 13, 14 and 15 (FIG. 1) or 12', 13', 14' and 15' (FIG. 2) are mounted in the housing 1 or 1'. A first guide roller 16 (FIG. 1) or 16' (FIG. 2) is mounted at the free end of the left input arm 6 or 6' in the housing 1 or 1'. A second guide roller 17 (FIG. 1) or 17' (FIG. 2) is mounted at the free end of the right input arm 7 or 7' in the housing 1 or 1'.

A first cable 18 (FIG. 1) or 18' (FIG. 2) is affixed at one end to the upper end 10 or 10' of the output arm 9 or 9' and is stationarily affixed at the other end 19 (FIG. 1) or 19' (FIG. 2). The first cable 18 or 18' abuts the first guide roller 16 or 16' and the rollers 12 and 13 or 12' and 13'.

A second cable 20 (FIG. 1) or 20' (FIG. 2) is affixed at one end to the lower end 11 or 11' of the output arm 9 or 9' and is stationarily affixed at the other end 21 (FIG. 1) or 21' (FIG. 2). The second cable 20 or 20' abuts the second guide roller 17 or 17' and the rollers 14 and 15 or 14' and 15'.

When the right end 5 or 5' of the input arm 3 or 3' is depressed, as shown in FIGS. 1 and 2, the second guide roller 17 or 17' depresses the second cable 20 or 20' and said second cable pulls the lower end 11 or 11' of the output arm 9 or 9' to the right. When the left end 4 or 4' of the input arm 3 or 3' is depressed, the first guide roller 16 or 16' depresses the first cable 18 or 18' and said first cable pulls the upper end 10 or 10' of the output arm 9 or 9' to the right.

The housing 1 of the embodiment of FIG. 1 is linearly movable. The other end 19 and 21, respectively, of each of the first and second cables 18 and 20 is stationarily affixed outside the housing 1. Additional guide rollers 22 and 23 are provided outside the housing 1 for guiding the first and second cables 18 and 20.

The housing 1' of the embodiment of FIG. 2 is arcuately movable along an arc 24. The other end 19' and 21', respectively, of each of the first and second cables 18' and 20' is stationarily affixed to the housing 1'. A central guide roller 25 is mounted at the axis 26 of the arc 24 along which the housing 1' is movable. The central guide roller 25 guides the first and second cables 18' and 20' between the housing 1' and the output arm 9'.

While the invention has been described by means of specific examples and in specific embodiments, I do not wish to be limited thereto, for obvious modifications will occur to those skilled in the art without departing from the spirit and scope of the invention.

I claim:

1. A cable control system for transmitting power, comprising a movable housing having an input fulcrum thereon;

an input arm pivotally mounted on the input fulcrum and having a left end and a right end;

a left input arm pivotally mounted on the input arm at the left end thereof and hanging downward into the housing;

a right input arm pivotally mounted on the input arm at the right end thereof and hanging downward into the housing;

a stationary output fulcrum positioned at right angles to the input fulcrum;

an output arm pivotally mounted on the output fulcrum and having an upper end and a lower end;

a plurality of guide rollers mounted in the housing;

a first guide roller mounted at the free end of the left input arm in the housing;

a second guide roller mounted at the free end of the right input arm in the housing;

a first cable affixed at one end to the upper end of the output arm and stationarily affixed at the other end and abutting the first guide roller and some of the plurality of guide rollers; and a second cable affixed at one end to the lower end of the output arm and stationarily affixed at the other end and abutting the second guide roller and others of the plurality of guide rollers whereby when the right end of the input arm is depressed the second guide roller depresses the second cable and the second cable pulls the lower end of the output arm to the right and when the left end of the input arm is depressed the first guide roller depresses the first cable and the first cable pulls the upper end of the output arm to the right.

2. A cable control system as claimed in claim 1, wherein the housing is linearly movable and the other end of each of the first and second cables is stationarily affixed outside the housing.

3. A cable control system as claimed in claim 2, further comprising additional guide rollers outside the housing for guiding the first and second cables.

4. A cable control system as claimed in claim 1, wherein the housing is arcuately movable along an arc and the other end of each of the first and second cables is stationarily affixed to the housing.

5. A cable control system as claimed in claim 4, further comprising a central guide roller at the axis of the arc along which the housing is movable, said central guide roller guiding the first and second cables between the housing and the output arm.

* * * * *